Figure 1:
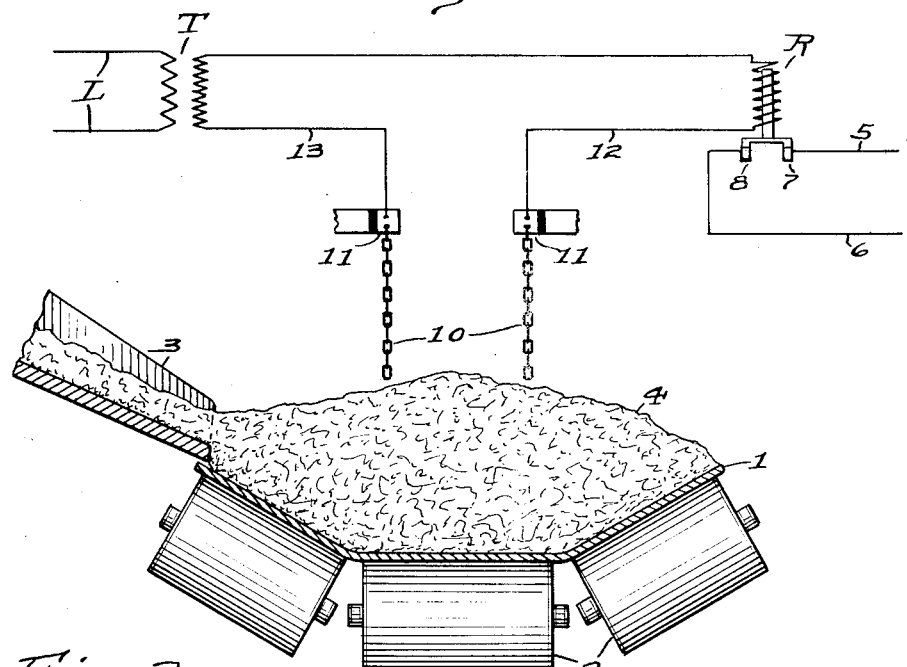

May 2, 1933. A. PABST, JR 1,907,089
SAFETY DEVICE FOR MATERIAL HANDLING APPARATUS
Filed Feb. 11, 1930

INVENTOR
Albert Pabst Jr.

WITNESS
F. J. Hartman.

BY
ATTORNEYS

Patented May 2, 1933

1,907,089

UNITED STATES PATENT OFFICE

ALBERT PABST, JR., OF YOUNGSTOWN, OHIO

SAFETY DEVICE FOR MATERIAL HANDLING APPARATUS

Application filed February 11, 1930. Serial No. 427,477.

The present invention is directed to the provision of means for preventing or reducing overloaded conditions in material handling apparatus, such as is ordinarily used for the conveyance and delivery of iron ore, coke and other like materials, and more especially in large industrial plants, as iron and steel foundries, coke plants and others where the material handling apparatus is usually arranged for automatic or substantially automatic operation and where overloading of the apparatus may result in undesirable interference with the normal operations of the plant. The forms of safety appliances heretofore employed for such purposes have been so arranged in association with the material handling apparatus, for example with a blast furnace skip car to which material is delivered by an endless belt conveyor, that the safety appliances do not become operative to prevent delivery of excess amounts of material to the conveyor until after the latter has become overloaded from excessively rapid feed or other cause, and appreciable amounts of time and labor must then be expended in order to remove the excess material and permit normal operations to be resumed.

Furthermore, such overloading of the handling apparatus may, if not prevented, cause serious damage to associated parts of the machinery, as for example, in coke plants when the screening devices become overloaded which is apt to cause backing up of the material in the crusher equipment and resulting breakage thereof.

Among the purposes and objects of my invention, therefore, is to provide a safety device for material handling apparatus which is automatically operative to decrease or arrest the feeding of the material thereto when for any cause the rate of feed has become such that overloading of the apparatus would otherwise result.

A further object of my invention is to provide electrically actuated means for controlling the feed of material to the handling apparatus adapted to decrease or arrest the feed upon any abnormal increase in the rate thereof whereby overloading of the apparatus is prevented substantially at its inception, and the necessity of arresting the operation of parts of the machinery to permit subsequent manual relieving of overloaded conditions is avoided.

A further object of my invention is to provide electrically operated means for controlling the feeding mechanisms of material handling apparatus whereby too rapid delivery of material to the latter is automatically prevented.

A still further object of the invention is to provide a safety device of the character aforesaid which is adapted to function and thereby relieve conditions which would otherwise result in overloading when the material attains a predetermined position with respect to the apparatus and in which the material itself is utilized to complete an electric circuit upon the attainment of such position to thereby actuate the device.

Other purposes, objects and advantages of my invention are hereafter more specifically mentioned or will be apparent from the following description of certain embodiments thereof as shown in the accompanying drawing.

Figure 2:
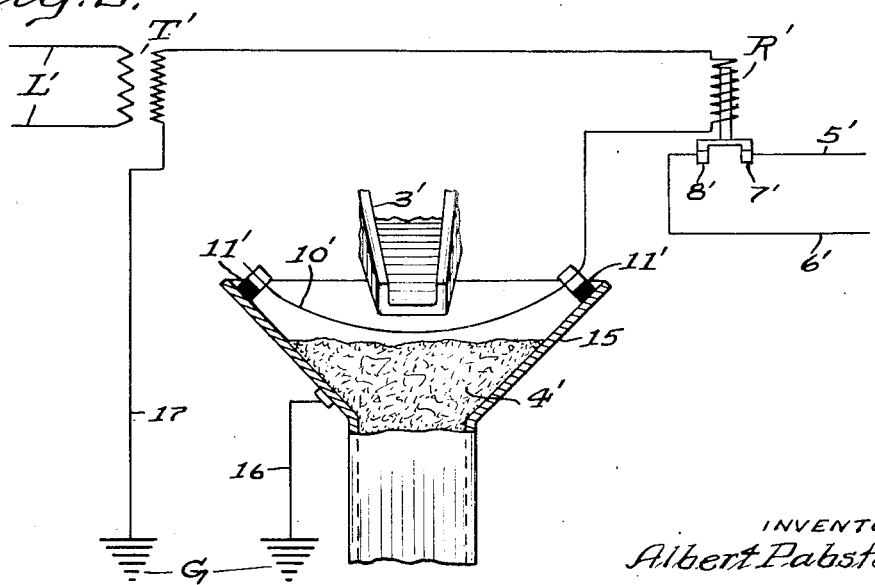

In said drawing I have shown somewhat diagrammatically in Fig. 1 a preferred embodiment of the invention in operative association and combination with material handling apparatus comprising a belt conveyor, shown in transverse section, and in Fig. 2 I have similarly diagrammatically shown a modified embodiment thereof which I find convenient for employment in operative association and combination with apparatus comprising a metallic hopper, shown in the drawing partly in vertical section. Parts in Fig. 2 corresponding to parts in the preceding figure are indicated with the same characters of reference but with the addition of a prime (') to each.

Referring now to Fig. 1, a belt conveyor 1 of any usual type such, for example, as ordinarily employed for conveying material to a blast furnace, is adapted to travel progressively on rollers 2, journaled in suitable supports (not shown) past a chute 3, from which it receives material 4 such as iron ore, coke or the like delivered thereinto by feeding mechanism or otherwise in the usual way. Connected to the feeding mechanism (not shown) or to any other means operable to regulate the material feed, and controlling the operation thereof, is an electric circuit comprising a pair of conductors 5, 6, respectively connected to the switch points 7, 8 of a relay R which is arranged to complete the circuit when deenergized. The feeding mechanism is desirably so arranged that feeding of the material continues in the usual way when its said controlling circuit is closed, that is, while the relay R is deenergized, but is automatically discontinued upon the opening of this circuit, through the energization of the relay R which may be of any suitable form.

It will be understood that any form of feeding mechanism may be employed as desired, as my invention requires for completely automatic operation only that said mechanism be capable of control by an electric circuit, and I provide in accordance with my invention means, as hereinafter described, operative to energize the relay to break the feed controlling circuit when the material upon the conveyor attains a predetermined and abnormal height.

To this end I provide a pair of chains 10, or other suitable preferably flexible conductors supported in spaced relation in any convenient way, as upon insulators 11 above the conveyor. The chains 10 may conveniently be disposed adjacent the chute 3 and are arranged to depend above the conveyor so as to clear the material thereon under normal conditions but to contact the material when it is heaped too high upon any portion of the conveyor as it passes under the chains. These chains are respectively connected in a circuit comprising the wires or leads 12, 13, the solenoid or corresponding actuating element of the relay R and a suitable source of current such, for example, as the secondary side of a transformer T which serves to step down current from the usual plant line L to a nondangerous voltage such as 25 or 50. Of course, any other source of current may be employed in place of the transformer if preferred.

As my invention is intended for use in association with apparatus employed for handling coke, iron ore and similar electrically conductive materials, it will be understood that when, through overloading of the conveyor, the material thereon contacts with the depending chains 10, the circuit through the relay R is completed, and the latter becomes immediately operative to open the circuit controlling the feed mechanism, thus diminishing or interrupting the feed. As the movement of the conveyor is not interrupted, however, the heaped-up material thereon continues to move under the chains, but due to the reduction in the rate of material feed or complete stoppage of the same, the amount of material carried by the conveyor under the chains very soon becomes insufficient to contact with the latter, and thus the circuit between the chains is broken and the relay R deenergized, again closing the feed controlling circuit and permitting the feed to be resumed.

In Fig. 2 I have shown a somewhat modified embodiment of my invention which I prefer to employ in preventing the overloading of a stationary metallic hopper, in which the movement of the material is relatively less than in a conveyor. Thus, in series with the transformer T', or other current source, and the relay R' controlling the feeding mechanism, I provide a somewhat flexible wire or cable conductor 10' and support the same adjacent the hopper 15 by insulators 11' at a suitable height above the normal level of the material 4' and suitably spaced from the chute 3' so as not to be reached by masses of material falling therefrom during ordinary operation, but adapted to contact with the material in the hopper when the hopper becomes overloaded. The hopper itself may be connected to the current source T' by direct wire, or through the medium of the grounds G—G by means of conductors 16, 17. Thus when the hopper becomes loaded with material to a height sufficient to contact the conductor 10' and thereby complete the circuit through the relay R', the latter will operate to open the feed controlling circuit and decrease or interrupt the feed of the material as hereinabove described. However, when the material level returns to normal and the material is thus no longer in engagement with the contactor 10', the circuit is opened and the relay R' deenergized, permitting resumption of the feed through the chute 3'.

As my invention is preferably arranged for entirely automatic operation as above described, it is apparent it is effective to prevent undesirable results from overloading of the apparatus even when the feeding mechanism is so adjusted that it continues to deliver the material too rapidly each time feeding is resumed, for it always operates to arrest or cut down the feed before the feeding mechanism has delivered any very appreciable excess of material and does not permit the feed to be resumed until the overloaded condition of the apparatus has been relieved. Thus, although with my invention delivery of the material may vary intermittently in amount when the feeding mechanism is feeding too rapidly, the average amount of material delivered in a given period is maintained substantially normal.

It will be understood that it is not necessary, for the purposes of my invention, that the circuit which I have denominated as the feed controlling circuit be connected directly to apparatus controlling the feed as, if desired, other mechanisms may be controlled thereby, or the circuit may be employed to signal to an operative that overloading is threatened, and it will be further understood that while I have herein described certain forms of my invention with some particularity, I do not desire or intend to limit or confine myself thereto, as the invention may be used in connection with numerous kinds of material handling apparatus and changes and modifications may be made in the details of construction and arrangement of the various parts, without departing from the spirit and scope of the invention as defined in the appended claims.

Having thus described my invention, I claim and desire to protect by Letters Patent of the United States:

1. The combination with a belt conveyor adapted to progressively transport loose solid material when disposed thereon, of an electric circuit, a switch disposed in said circuit and operative when opened to interrupt said circuit, a second circuit and, included therein, means operable to actuate said switch and means comprising spaced conductors adjacent the conveyor operative when engaged by material on the conveyor to complete the second circuit through said material to thereby energize said actuating means to interrupt the first circuit.

2. The combination with a belt conveyor adapted to receive loose electrically conductive solid material, of a relay disposed adjacent said conveyor, means for actuating said relay comprising a circuit and means disposed therein adjacent the conveyor comprising a pair of spaced flexible conductors operative to engage the material on the conveyor when the upper level of said material reaches a predetermined excessive level above the normal level to thereby complete the circuit through said material.

In witness whereof, I have hereunto set my hand this 7th day of February, 1930.

ALBERT PABST, Jr.